April 21, 1931.  H. R. STUART  1,802,094
TURBINE
Filed Jan. 19, 1926  2 Sheets-Sheet 1

Inventor
Harve R. Stuart
By Maréchal + Fehr
Attorneys

April 21, 1931. H. R. STUART 1,802,094
TURBINE
Filed Jan. 19, 1926   2 Sheets-Sheet 2
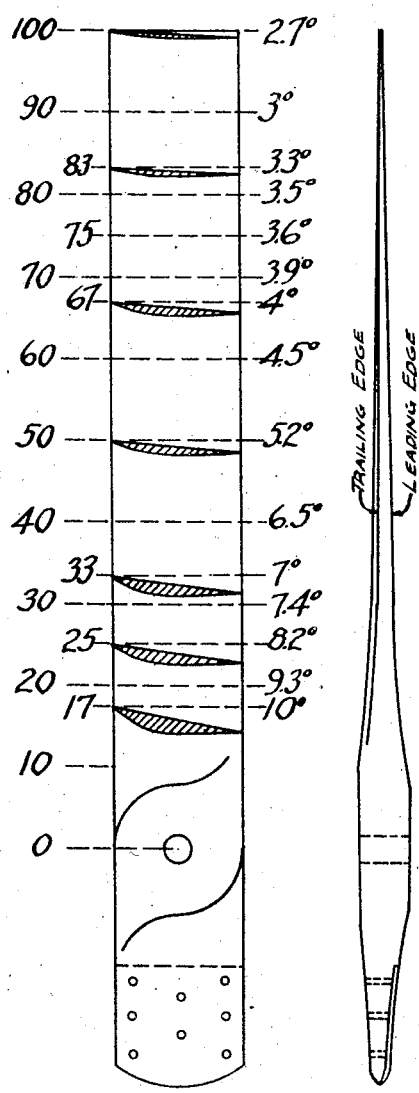
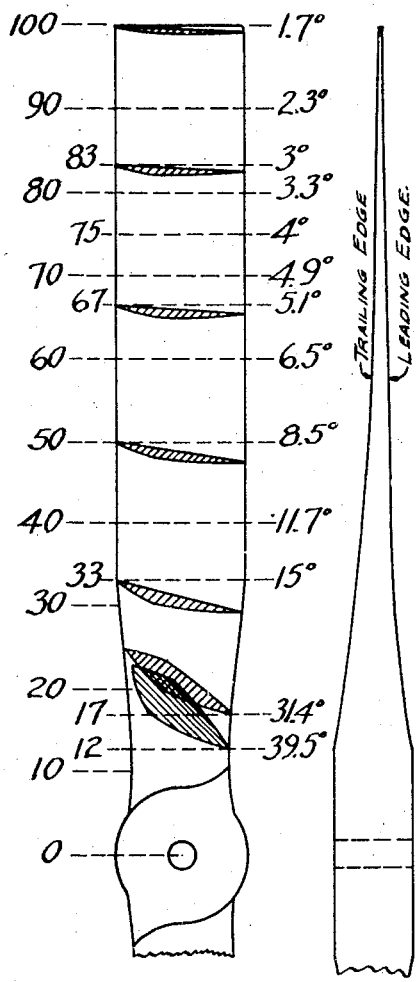
Fig.4. Fig.5.   Fig.2. Fig.3.
Inventor
Harve R. Stuart
By Maréchal + Fehr
Attorneys Patented Apr. 21, 1931

1,802,094

UNITED STATES PATENT OFFICE

HARVE R. STUART, OF SPRINGFIELD, OHIO, ASSIGNOR TO ELISHA N. FALES, OF LAKE FOREST, ILLINOIS

TURBINE

REISSUED

Application filed January 19, 1926. Serial No. 82,307.    MAR 5 1940

This invention relates to turbines, and more particularly to high-speed turbines.

One of the principal objects of this invention is to provide a turbine of such construction and design as to operate at a high speed as compared with the velocity of the fluid power stream.

Another object of the present invention is to provide a high-speed wind turbine or windmill adapted to be mounted directly upon the shaft of a small generator or other machine and to drive the same at high speed.

Other objects of the invention will appear from the following description when taken in connection with the accompanying drawings, in which:—

Figs. 2 and 3 are face and edge views respectively of a two-bladed wind turbine;

Figs. 4 and 5 are face and edge views respectively of a single-blade wind turbine.

Turbines or windmills of the type heretofore known have as a general rule been of the type which operate at low speeds, that is, at what is known technically as low tip-speed-ratio which is the ratio of the speed of the tip of the windmill or turbine blade to the velocity of the air stream or wind.

For example, the so-called American type of windmill consists generally of a large number of substantially sector shaped blades mounted upon a hub. This type of windmill is generally of quite large and heavy construction and revolves very slowly, having a no-load tip-speed-ratio of approximately 2. The so-called Dutch type of windmill, consisting generally of 4 wide blades made up usually of sticks and cloth, is in some respects an advance over the American type of windmill in that it commonly operates at a no-load tip-speed-ratio of about 4. However this type of blade also has many of the disadvantages of the American type of blade due to its great weight which makes it unresponsive to gusts of wind, and further due to its slow operating speed which makes it unsuitable for direct-drive connection with an electric motor or other high-speed machine. Both American and Dutch types of windmills are inherently inefficient due to their construction requiring bracing members, projecting parts or other features which are not conducive to the good utilization of the air forces.

The present invention provides a high-speed wind turbine which is free from the disadvantages of the so-called American, the Dutch or other types of windmills.

Figure 1:
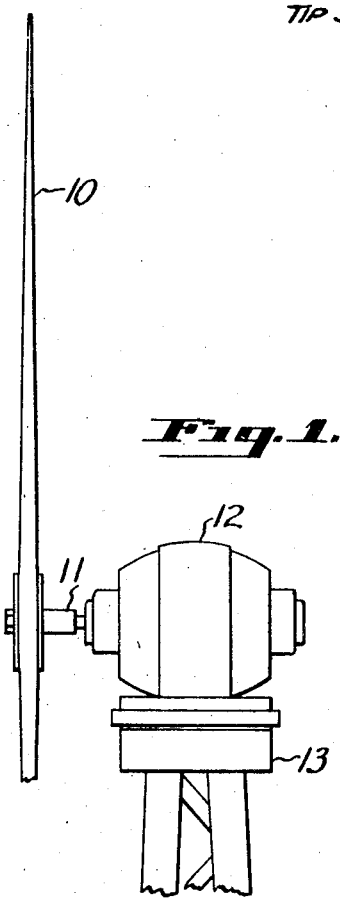
Fig. 1 shows a high-speed wind turbine mounted directly upon the shaft of a small generator.

Fig. 1 illustrates a two-bladed high-speed wind turbine 10 constructed in accordance with the present invention and, as shown, the turbine is mounted directly upon and carried by the armature shaft 11 of a small generator 12 which may be supported upon a suitable pedestal 13 in the wind stream.

One preferred construction of my two-bladed high-speed wind turbine is shown in Figs. 2 and 3. The length of the blade from its hub to its tip is considered as being divided into 100 stations, station 0 being at the hub and station 100 being at the tip of the blade. It will be observed that the blade of the wind turbine illustrated is warped, the angle of the blade increasing from 1° 40' at station 100 to approximately 40 at station 12. The blade is constructed to have a good airfoil section in accordance with the best modern practice and dependent upon the angle of the blade. This blade has a no-load tip-speed-ratio of 11 as compared with the no-load tip-speed-ratios of approximately 2 and 4 for the American and the Dutch types of windmills, respectively. The tip-speed-ratio of a turbine varies, of course, with the load or resistance to turning but for the purpose of comparison the values of tip-speed-ratios stated herein are all given for the condition of no-load, that is, when the turbine is running free.

While Figs. 2 and 3 illustrate the preferred form of two-bladed turbine, it will be understood that good results may be obtained from wind turbines having blades which depart somewhat from the blade illustrated. The preferred form of blade illustrated in these figures has an angle of 4° at what is called the reference station, which reference station is station 75. Good results may be obtained from blades having angles at the reference station varying up to as high as 12°, the form and the warp of the blade from tip to hub being, of course, proportioned to harmonize with the angle at the reference station. A satisfactory formula for determining the warp at any station "N" of a blade constructed in accordance with my invention and my preferred airfoil section is as follows:

$$\alpha_n = \cot^{-1}\left(\frac{Nf}{100}\right) - \cot^{-1}(.75f) + 25.5 - 1.949f + .06(N-75)\left(\frac{f}{11}\right)$$

where $f$ is the no-load tip-speed-ratio of the blade and $\alpha_n$ is the angle of the blade at a particular station N. It has also been discovered that good results may be obtained from the blade when the angle of the outer part of the blade between stations 60 or 70 and 100 is varied otherwise than in accordance with the warp formula given above, such variation of blade angle being preferably confined to the range from 0° to 12°, and the blade may even be made of uniform angle between the stations referred to. It should be understood, however, that increased variation from the preferred form of blade illustrated results to some degree in loss of the desirable characteristics inherent in the preferred form of blade, although blades embodying the modified constructions referred to are in all cases found to be superior to the prior conventional forms of windmills, such as the American and the Dutch types.

As illustrated the preferred form of blade shown in Figs. 2 and 3 has an angle of approximately 40° at station 12, but it should be understood that that portion of the turbine blade between stations 0 and 50 or 60 may be varied considerably and certain sections may even depart from airfoil shapes as it has been found in practice that the lower number stations do not exert the same influence on the performance and efficiency of my wind turbine blade as the higher number stations. Satisfactory results have been obtained with turbine blades having blade angles near the hub as low as 4°.

I have discovered that the thickness or camber of the airfoil section of the blade has an important bearing on the blade angle which may be utilized to obtain a blade of satisfactory high tip-speed-ratio. By adopting a blade of higher camber and a suitable contour the blade angle may be increased somewhat, and it has been found that satisfactory results may be secured corresponding to those obtained with the lower camber blades above described, with blades having blade angles as much as four degrees higher than those of the corresponding lower camber blades.

The principle of the present invention may be embodied to even a higher degree in a single-bladed high-speed wind turbine. A preferred form of such a single-bladed high-speed turbine is illustrated in Figs. 4 and 5, the blade illustrated having a no-load tip-speed-ratio of substantially 14, which means that the tip of the blade moves at a speed fourteen times as fast as the wind which actuates the blade. This blade is preferably also of good airfoil section and is warped accordingly to a formula analogous to the warp formula given above. It has also been found that the single-bladed turbine may be varied somewhat in its form and construction, and satisfactory results have been obtained from blades which vary in angles, warp and airfoil sections as described in connection with the two-bladed turbine. Preferably however the angle of the blade in the tip portion is not greater than 9° or 10°, and the angle of this particular portion of the blade can best be made about 3°. From stations 60 or 70 out to station 100 the blade angle is less than 5° in forms shown in Figs. 4 and 5, although this figure may be increased by several degrees and still give very satisfactory operation. The single-bladed turbine is provided with a counterweight which may be in the form of a plate 14, and is preferably mounted for movement on its support about an axis transverse to the longitudinal axis of the blade. The ratio of blade length to blade width is preferably, though not necessarily, six to one as clearly shown in Figs. 2 to 5.

High-speed wind turbines constructed in accordance with the present invention possess numerous advantages over the prior types of windmills. Of prime importance is the fact that the high-speed wind turbines may be direct-connected to a generator so as to drive the same at high speed. This makes possible the elimination of gearing and special mounting which has heretofore been necessary to support the gearing and the heavy windmills. My high-speed wind turbine is of light weight as compared with prior windmills, and hence it is cheap, and may be easily mounted on light weight supports. Owing to its lightness and low inertia, a high-speed wind turbine responds to wind gusts better than prior forms of windmills and may often be operated by gusts of wind which are of insufficient duration or of such a character that they could not be utilized by prior forms of windmills. This ability to respond to gusts of wind is an important advantage at certain times. This will be apparent when it is appreciated that the energy available from the wind varies as the third power of the wind velocity and that the gusts of wind therefore represent the greater part of the energy available at such times. For example, if a gust of wind should double the wind velocity, then the power of the wind at the moment of the gust would be eight times the power before or after the gust, and it will be apparent, therefore, that frequent gusts of this order may constitute a large portion of the available wind energy. Further, due to the type of construction of the high-speed wind turbine, it has great strength and can stand a much higher speed of revolution than the old-fashioned windmills without danger of injury to itself. It can thus utilize high winds which would require the conventional American and Dutch or other types of windmills to swing out and perhaps stop running altogether.

Figure 6:
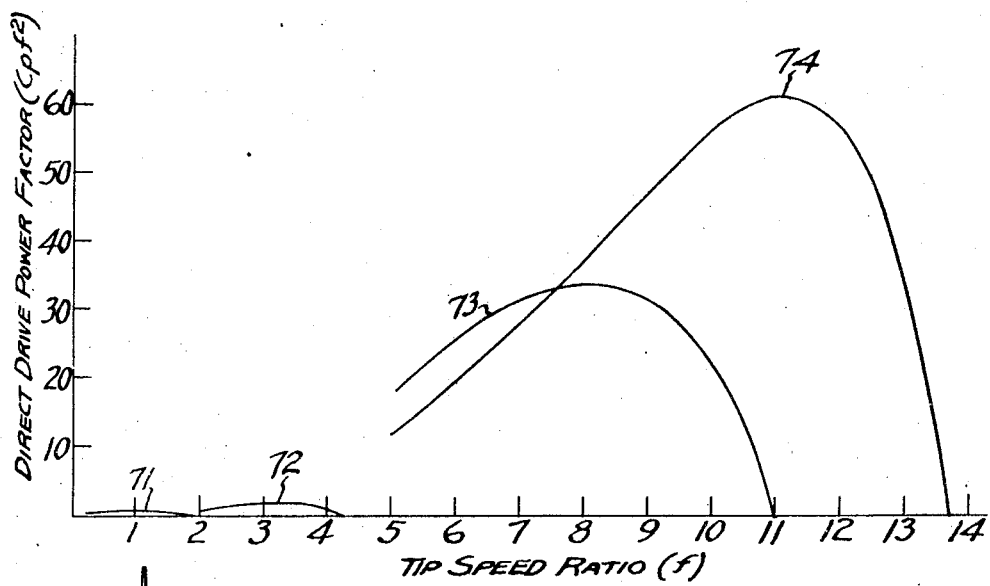
Fig. 6 is a diagram illustrating certain characteristics of high-speed wind turbines.

Fig. 6 illustrates in diagrammatic form one advantage of my invention which is the ability of the high-speed wind turbine to obtain great power from the wind when it is direct-connected with a generator or other machine. In this diagram the tip-speed-ratio $(f)$ is plotted against the direct drive power factor $(Cpf^2)$, which represents the power obtainable from direct-connected windmills or turbines operating at a given speed (R. P. M.) and in a given wind velocity, and whose diameter is adjusted to attain the given R. P. M. As is well understood, the prior types of windmills are essentially slow speed affairs, and high R. P. M. can be attained only by reducing the diameter which in turn reduces the power that can be taken from the wind by the windmill. The curve designated at 71 represents the direct drive power factor for a conventional American type windmill. Such a windmill has a no-load tip-speed-ratio of approximately 2. The maximum power available from the American type of windmill is obtained when this windmill is loaded up, and hence slowed down to a point where its tip-speed-ratio is approximately 1.4, at which point the power available is .6. 72 represents a similar curve for the conventional Dutch type of windmill having a no-load tip-speed-ratio of 4. In this case the maximum power obtainable is 2 at a tip-speed-ratio of approximately 3. 73 represents the direct drive power factor curve for my two-bladed high-speed wind turbine constructed substantially as shown in Figs. 2 and 3 and having a no-load tip-speed-ratio of approximately 11. This blade yields a maximum power of 34 when the blade is loaded to have a tip-speed of approximately 8. The direct drive power factor for a single-bladed high-speed wind turbine constructed substantially as shown in Figs. 4 and 5, is indicated at 74. This blade has a no-load tip-speed-ratio of approximately 14 and yields a maximum power of 60 when the blade is loaded and its tip-speed-ratio is approximately 11. These curves as previously stated correspond to blade designs all operating at the same rotational speed in a given wind speed, curve 71 corresponding to a windmill of small diameter, having short blades giving very small power, curve 72 corresponding to a mill of somewhat larger diameter, having longer blades productive of large power and curve 74 corresponding to a still longer blade productive of still greater power. If one would attempt to increase the length of blade of the old type of windmill to obtain more power than is represented by curve 71 the immediate result would be a decrease in speed of rotation for a given wind speed, hence this is impossible if high rotational speeds are to be obtained as where the blade is directly connected to a device such as a generator which will not be effective at low speeds. Fig. 6 illustrates graphically and forcibly the great advantage of my high-speed wind turbine blades as compared with the conventional American and Dutch types of windmills, as regards the ability of the turbines to extract power from the wind when direct-connected with a work machine such as a generator.

My invention, while particularly adapted for direct-drive connection with a work machine, is equally useful when gear-connected with work machines. The advantages pointed out, such as light weight of turbine, low cost, quick response to wind gusts and so forth are equally advantageous when the high tip-speed turbine is substituted for the prior windmills.

While the forms of apparatus herein described constitute preferred embodiments of the invention, it is to be understood that the invention is not limited to these precise forms of apparatus, and that changes may be made in either without departing from the scope of the invention which is defined in the appended claims.

What is claimed is:

1. A power device comprising the combination with a generator having a rotor and a rotor shaft, a wind turbine having a high no-load tip-speed-ratio greater than 5 mounted on said rotor shaft, and adapted to drive the same at high turbine speed, the wind turbine being of small blade number and the blades themselves being of small angle with respect to the plane of revolution.

2. In the wind turbine art, a high-speed wind turbine blade having a high no-load tip-speed-ratio, said blade being direct-connected with the rotor of a generator to drive the same at high speed, the no-load tip-speed-ratio of the blade being greater than 9, and the blade having small angles with respect to the plane of revolution.

3. A fluid power turbine comprising a blade constructed and arranged to operate with a no-load tip-speed-ratio of greater than 5, the blade angle with respect to the plane of revolution being small.

4. A wind turbine comprising a blade having small blade angles with respect to the plane of revolution, constructed and arranged to operate with a no-load tip-speed-ratio of greater than 9.

5. A wind turbine having a no-load tip-speed-ratio greater than 5, having a blade angle between stations 60 and 100 no greater than 12 degrees.

6. A fluid turbine having a no-load tip-speed-ratio greater than 5, having a blade angle between stations 70 and 100 no greater than 7 degrees.

7. A wind turbine having a no-load tip-speed-ratio greater than 5, having a warped blade whose angle at the reference station is not greater than 12 degrees.

8. A high-speed wind turbine of the character described having a no-load tip-speed-ratio greater than 5 and having an impeller blade having an angle with the plane of rotation at the tip of the blade of substantially three degrees.

9. A high-speed wind turbine of the character described having a no-load tip-speed-ratio greater than 5 and having an impeller blade having an angle with the plane of rotation at the tip of the blade between zero and ten degrees.

10. A high-speed wind turbine of the character described having a no-load tip-speed-ratio greater than 5 and having a small number of blades each having an aerofoil section providing a curved side which faces away from an approaching wind, said wind turbine having an impeller low-angle blade extending substantially continuously from the tip to the hub of the propeller, the ratio of blade length to blade width being approximately six to one, the blade angle at the tip of the blade being between 0 and 10 degrees.

11. A fluid power turbine having a blade angle between stations 70 and 100 no greater than 7° and having an operating no-load tip-speed ratio greater than 9.

12. A wind turbine having a single impeller blade having a blade angle between stations 70 and 100 no greater than 5° and arranged to operate with a no-load tip-speed ratio of greater than 9.

13. A two-bladed wind turbine having a no-load tip-speed-ratio greater than 9, the blades having an aerofoil cross-sectional shape of small blade angles with respect to the plane of revolution, the angle at the tip of the blade being less than 4 degrees and the angle of the blade at station 70 being less than 7 degrees.

In testimony whereof I hereto affix my signature.

HARVE R. STUART.

DISCLAIMER 1,802,094.—*Harve R. Stuart*, Springfield, Ohio. TURBINE. Patent dated April 21, 1931. Disclaimer filed December 12, 1938, by the assignee, *Elisha N. Falls;* the licensee, *Zenith Radio Corporation*, joining and approving.

Hereby enters this disclaimer to claims 1, 2, 3, and 4 in said patent.

[*Official Gazette January 10, 1939.*]